J. Morgan & W. Cline Jr.
Revolving Horse Rake.
Nº 99457.    Patented Feb. 1. 1870
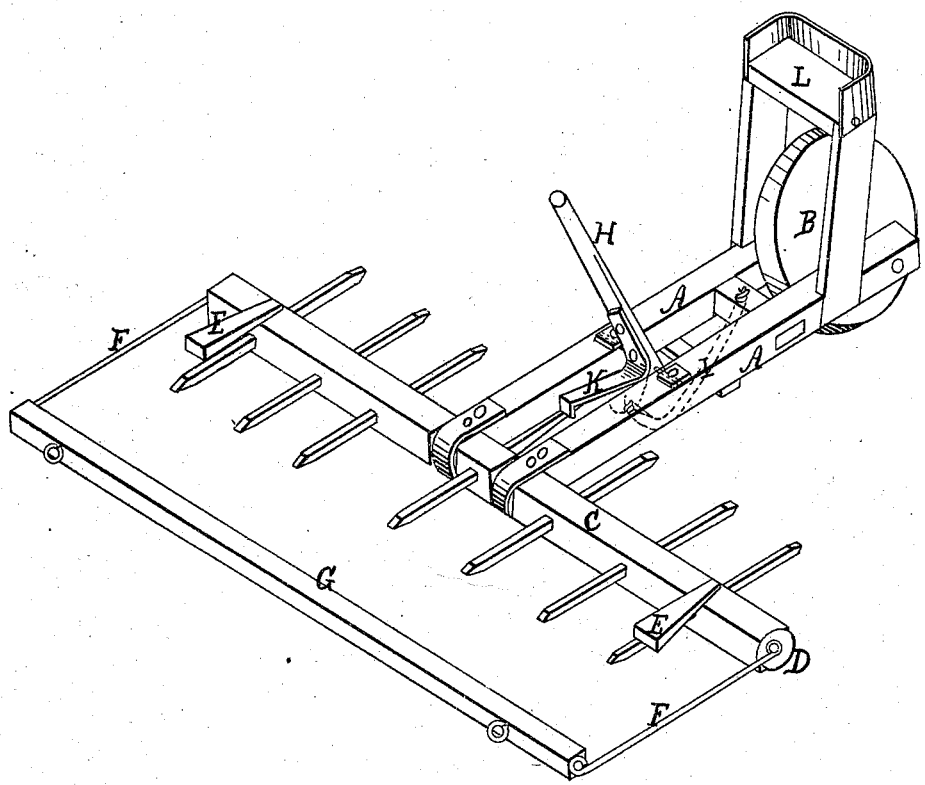
Witnesses.
Inventor.
John Morgan
Wm Cline Jr.
per Alexander & Mason
Attys

United States Patent Office.

JOHN MORGAN AND WILLIAM CLINE, JR., OF CLAYTON, INDIANA.

Letters Patent No. 99,457, dated February 1, 1870; antedated January 24, 1870.

IMPROVEMENT IN HORSE HAY-RAKES.

The Schedule referred to in these Letters Patent and making part of the same.

*To all whom it may concern:*

Be it known that we, JOHN MORGAN and WILLIAM CLINE, Jr., of Clayton, in the county of Hendricks, and in the State of Indiana, have invented certain new and useful Improvements in Horse Hay-Rakes; and do hereby declare that the following is a full, clear, and exact description thereof, reference being had to the accompanying drawing, and to the letters of reference marked thereon, making a part of this specification.

The nature of our invention consists in the construction of a horse hay-rake, which shall be extremely simple in its operation, and in the arrangement of the devices hereafter set forth and described.

The accompanying drawing is a perspective view of our invention.

Letter A represents two beams, which form the frame of the sulky, the rear ends of which are supported by the wheel B.

To the front ends is secured the revolving rake C, in such a manner that it can be made to make a half revolution whenever it is desired to dump the load.

Upon the ends of the rake-bar there is placed a small wheel, D, so as to carry the bar over stones and obstructions without catching.

Upon both top and bottom of this bar there are placed wedge-shaped arms E, which extend outward, and which prevent the bar from resting upon the earth as it is moved along.

Attached to each end of the rake-bar is an arm or rod, F, which extend forward, and are secured to the draught-bar G, to which the horses are fastened. As the rods are pivoted loosely to both of these bars, the one, G, may be swung back over the frame when not wanted.

Pivoted between the beams A is the lever H, by means of which the rake is made to revolve, so as to dump its load.

Secured to front side of the lever is the arm K, which extends outward far enough to catch the top of one of the prongs of the rake, so as to hold it down and prevent the rake from revolving.

The lower end is curved upward, so as to catch under the rake, so that by drawing the lever back toward the seat L the rake will be raised high enough for its prongs to catch on the ground, when the forward motion of the machine will cause it to fall over of itself, leaving the load behind.

Attached to the end of the lever, and then secured to a cross-piece between the beams, is a spring, I, shown in dotted lines, which draws the lever back to its first position after tilting the rake.

Having thus described our invention,

What we claim, and desire to secure by Letters Patent, is—

1. The arrangement of the beams A A, wheel B, seat L, rake C, rods F F, and draught-bar G, all substantially as shown and described.

2. In combination with the above, the wheels D D, arms E E, lever H, arm K, and spring I, all constructed and arranged substantially as shown and described.

In testimony that we claim the foregoing, we have hereunto set our hands, this 30th day of April, 1869.

JOHN MORGAN.
WILLIAM CLINE, JR.

Witnesses:
YOUNG W. SHORT,
ELIAS BLUE.